(12) United States Patent
SanGregory et al.

(10) Patent No.: US 6,393,221 B1
(45) Date of Patent: May 21, 2002

(54) ELECTRONIC FLASH UNIT WITH INTEGRATED FLASH CHARGE SWITCH

(75) Inventors: Jude A. SanGregory, Spencerport; Michael R. Allen, Churchville, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/620,195

(22) Filed: Jul. 20, 2000

(51) Int. Cl.[7] ................................................ G03B 15/05

(52) U.S. Cl. ...................................... 396/205; 396/543

(58) Field of Search ................................. 396/176, 177, 396/178, 205, 206, 155, 543

(56) References Cited

U.S. PATENT DOCUMENTS 3,810,212 A * 5/1974 Biber ........................... 396/206

* cited by examiner

Primary Examiner—W. B. Perkey
(74) Attorney, Agent, or Firm—Roger A. Fields

(57) ABSTRACT

An electronic flash unit includes a flash circuit board, an illumination-producing flash tube having two opposite end electrodes, respective electrical conductors contacting the opposite end electrodes to electrically connect them to the flash circuit board, an energy-storing capacitor electrically connected to the flash circuit board and chargeable to a storage capacity sufficient to cause the flash tube to provide illumination, and a flash charge switch which when manually closed permits the capacitor to be charged. The flash charge switch has a movable closing-switch element that forms an integral single piece with one of the electrical conductors contacting the opposite end electrodes of the flash tube.

6 Claims, 3 Drawing Sheets

ELECTRONIC FLASH UNIT WITH INTEGRATED FLASH CHARGE SWITCH

CROSS-REFERENCE TO RELATED APPLICATION

Reference is made to commonly assigned, co-pending application Ser. No. 09/621,292 entitled FLASH CAMERA WITH TOP-POSITIONED FLASH CHARGE BUTTON and filed Jul. 20, 2000 in the names of Joel S. Lawther, Jude A. SanGregory and Michael R. Allen.

FIELD OF THE INVENTION

The invention relates generally to the field of photography, and in particular to an electronic flash unit for use in a camera. More specifically, the invention relates to an electronic flash unit with an integrated flash charge switch.

BACKGROUND OF THE INVENTION

Electronic flash illumination, as used in photography, is produced by an instantaneous electric discharge between two opposite end electrodes in a gas-filled flash tube. In practice, the electrical energy for the discharge is stored in a capacitor. The main components of an electronic flash unit are therefore the power supply, the capacitor, the triggering circuit, and the flash tube itself usually with a partially surrounding reflector.

At present, electronic flash units are built into a broad spectrum of cameras, from disposable one-time-use cameras to sophisticated single-lens reflex cameras. Typically, they use a high-frequency oscillator to convert the dc voltage from a battery to an ac voltage that's stepped up in a transformer. This high voltage is rectified back to dc and stored in a main capacitor connected to a glass-walled flash tube filled with xenon and small amounts of other gases. The oscillator, the rectifier, the transformer, and the battery constitute a flash charging circuit that is activated when a flash charge switch is closed, often by manually depressing a flash charge button at the front of a camera. A monitoring circuit ignites a flash ready light when the stored voltage in the main capacitor approaches a peak capacity. The stored voltage cannot discharge through the flash tube until the xenon becomes ionized. This happens when the camera's shutter-flash synchronization switch closes, dumping the charge from a small trigger capacitor into an ignition coil connected to the flash tube, which produces a brief burst of voltage applied to the glass wall of the flash tube via a third (triggering) electrode. The xenon is then ionized to provide a conductive path for the stored voltage from the main capacitor, which results in the electronic flash illumination.

Often, the flash tube is positioned between a front transparent or translucent cover-lens and a rear reflector that partially resides in a cut-out in a flash circuit board. Respective electrical conductors contact the two opposite end electrodes of the flash tube to electrically connect them to the flash circuit board. See prior art U.S. Pat. No. 6,075,948 issued Jun. 13, 2000.

THE CROSS-REFERENCED APPLICATION

The cross-referenced application discloses a flash camera including a taking lens, a viewfinder, a flash cover-lens, a shutter release button manually depressible to initiate a film exposure, a flash charge button manually depressible to charge a flash capacitor, and a six-faced polyhedron housing having a front face with a front opening for the taking lens, a front opening for the viewfinder and a front opening for the flash cover-lens, and having a top face perpendicular to the front face and with a top opening at least partially surrounding the shutter release button. According to the invention, the top face has a top opening at least partially surrounding the flash charge button and closer to the front opening for the flash cover-lens than to the front opening for the viewfinder and the front opening for the taking lens.

SUMMARY OF THE INVENTION

An electronic flash unit comprising a flash circuit board, an illumination-producing flash tube having two opposite end electrodes, respective electrical conductors contacting the opposite end electrodes to electrically connect them to the flash circuit board, an energy-storing capacitor electrically connected to the flash circuit board and chargeable to a storage capacity sufficient to cause the flash tube to provide illumination, and a flash charge switch which when manually closed permits the capacitor to be charged, is characterized in that:

the flash charge switch has a movable closing-switch element that forms an integral single piece with one of the electrical conductors contacting the opposite end electrodes of the flash tube.

DETAILED DESCRIPTION OF THE INVENTION

The invention is disclosed as being embodied preferably in a disposable one-time-use flash camera with a built-in electronic flash unit. Because the features of a one-time-use flash camera with a built-in electronic flash unit are generally known, the description which follows is directed in particular only to those elements forming part of or cooperating directly with the disclosed embodiment. It is to be understood, however, that other elements may take various forms known to a person of ordinary skill in the art.

Figure 1:
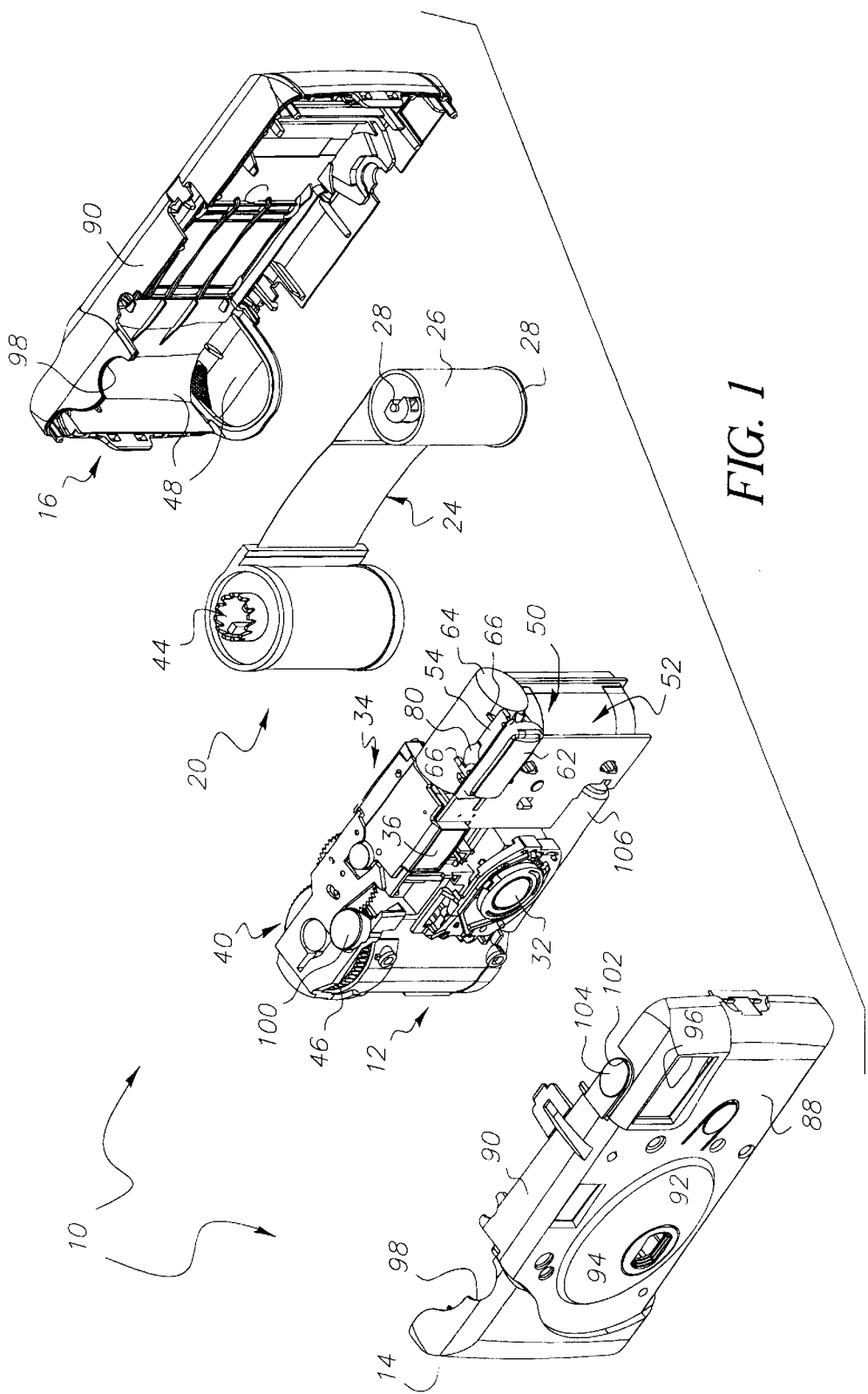
FIG. 1 is an exploded front perspective view of a disposable one-time-use camera having a built-in electronic flash unit according to a preferred embodiment of the invention.
Figure 2:
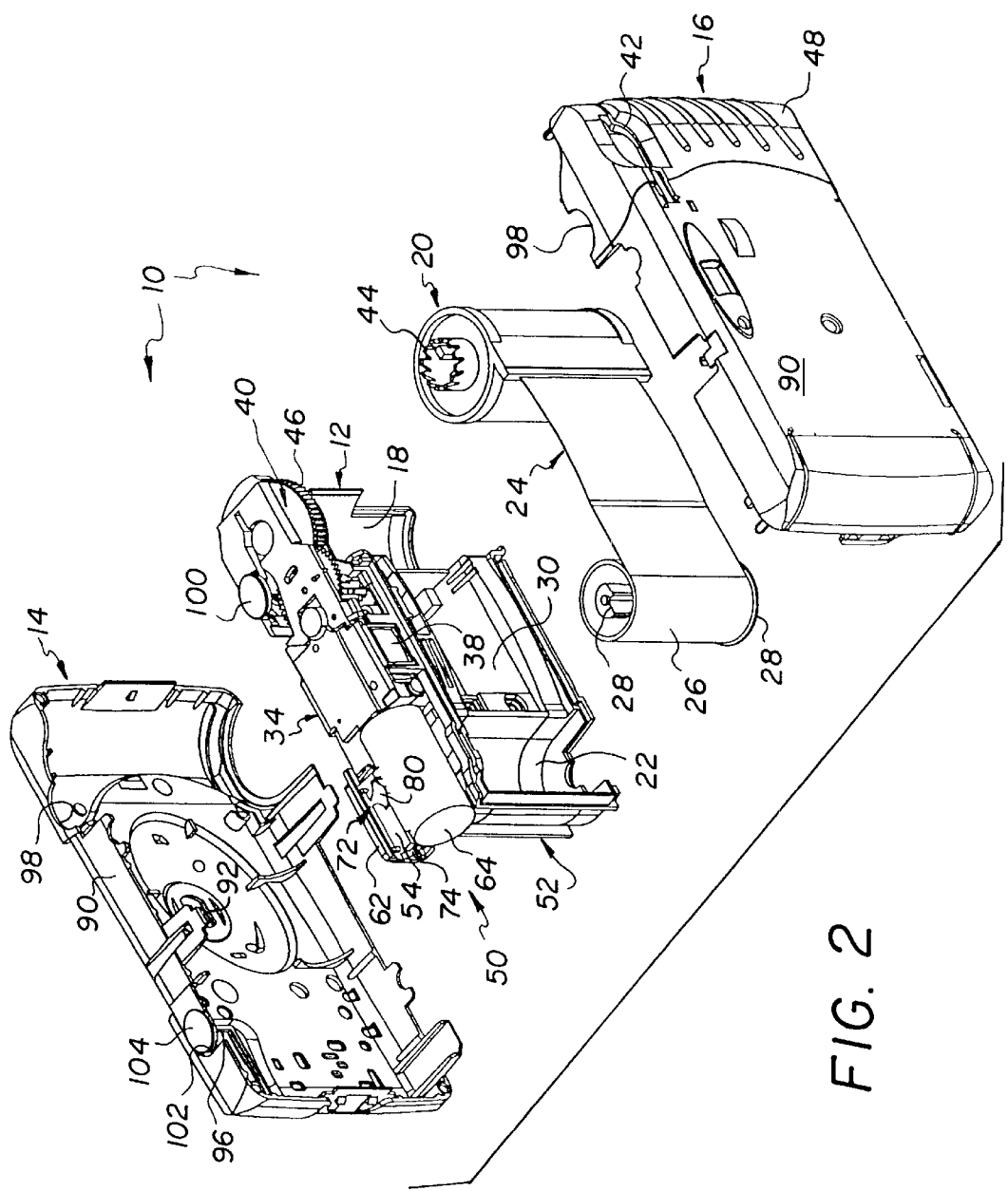
FIG. 2 is an exploded rear perspective view of the camera.

Referring now to the drawings, FIGS. 1 and 2 show a disposable one-time-use camera 10 including a plastic opaque main body part 12, a plastic opaque front cover part 14, and a plastic opaque rear cover part 16. The front cover part 14 and the rear cover part 16 house the main body part 12 between them and are connected releasably to one another and to the main body part 12 via known hook-in-hole connections.

As is typical, the main body part 12 has a rearwardly open cartridge receiving chamber 18 for a conventional film cartridge 20 and a rearwardly open film supply or film roll chamber 22. See FIG. 2. During manufacture, a filmstrip 24 is prewound from the film cartridge 20 into an unexposed film roll 26 on a film supply spool 28 which is placed in the film supply chamber 22. A rearwardly open backframe opening 30 is located between the cartridge receiving chamber 18 and the film supply chamber 22 for exposing successive frames of the filmstrip 24 when ambient light is received through a front taking lens 32 on the main body part 12. See FIG. 1.

A known optical viewfinder 34 is mounted on top of the main body part 12 and has a pair of front and rear viewfinder lenses 36 and 38 for viewing a subject to be photographed. See FIGS. 1 and 2.

A film winding thumbwheel 40, rotatably supported on top of the main body part 12, above the cartridge receiving chamber 18, radially protrudes partially from an elongate narrow opening 42 in the rear cover part 16 and has a depending coaxial stem (not shown) in coaxial engagement with an exposed top end 44 of a film take-up spool inside the film cartridge 20. The film winding thumbwheel 40 has a continuous alternating series of peripheral-edge symmetrical teeth 46 that readily permit the thumbwheel to be manually grasped or fingered to incrementally rotate the thumbwheel in a film winding direction, i.e. counter-clockwise in FIGS. 1 and 2, to similarly rotate the film take-up spool inside the film cartridge 20. This is done in order to wind an exposed frame of the filmstrip 24 from the backframe opening 30 into the film cartridge 20 after each film exposure, and to move a fresh frame of the filmstrip from the unexposed film roll 26 to the backframe opening. Each time the filmstrip 24 is advanced slightly greater than a frame width, a known metering lever or other known metering device (not shown) engages one of the teeth 46 to prevent rotation of the thumbwheel 40. The metering lever is disengaged from one of the teeth 46 as an incident of the film exposure.

When the filmstrip 24 is wound completely into the film cartridge 20, a rear/bottom portion 48 of the rear cover part 16 which at least partially covers the cartridge receiving chamber 18 is disengaged from the main body part 12 to permit the film cartridge to be removed from the cartridge receiving chamber.

Figure 3:
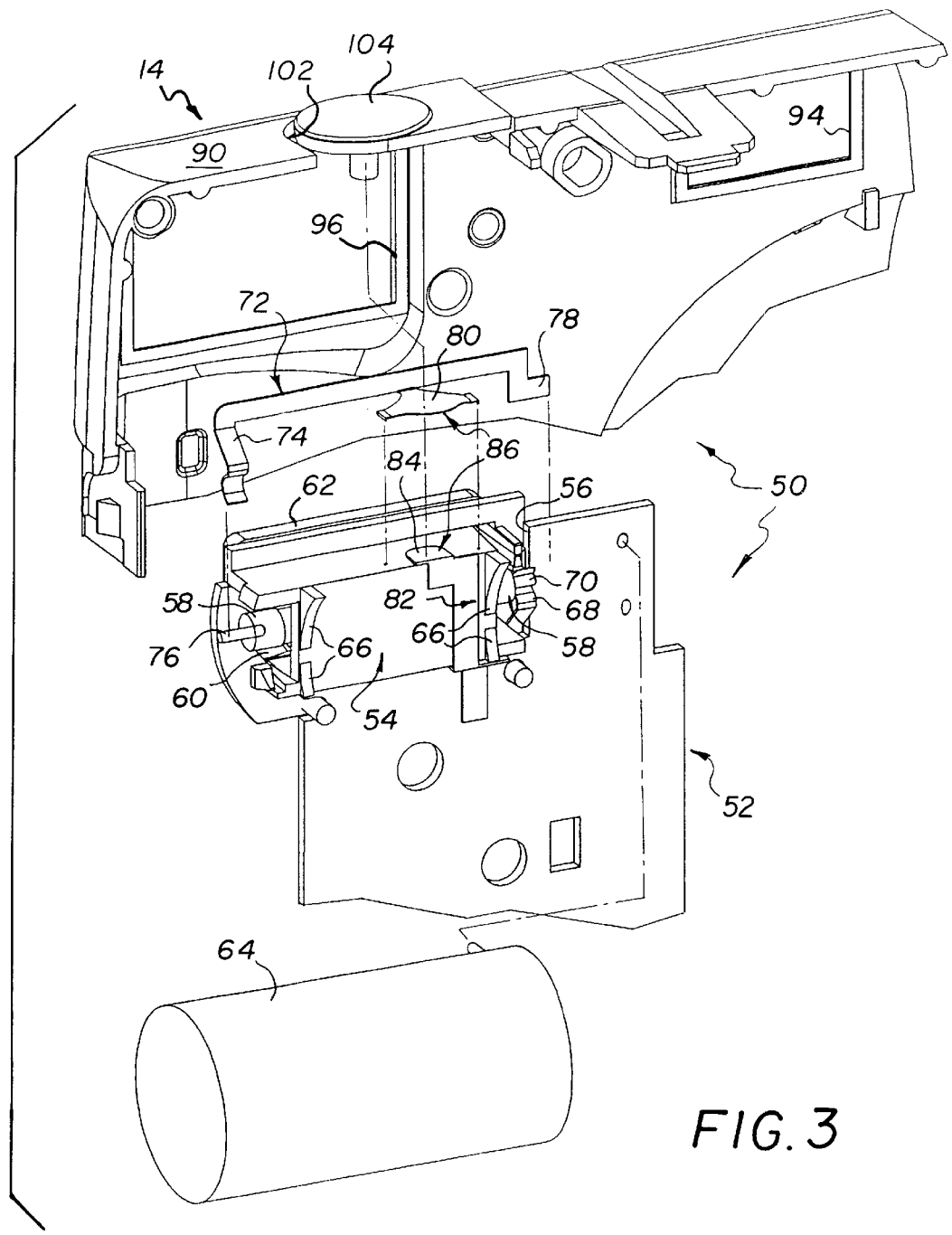
FIG. 3 is a partially exploded rear perspective view of the electronic flash unit.

A built-in electronic flash unit 50 is mounted on the main body part 12 in the vicinity of the film supply chamber 22. See FIGS. 1–3. The electronic flash unit 50 includes a flat flash circuit board 52, a plastic electrically non-conductive half-housing 54 positioned within a cut-out 56 in the flash circuit board, a conventional illumination-producing glass-walled flash tube 58 filled with xenon gas and positioned between a conventional rear flash reflector 60 and a conventional front light-transmitting (transparent or translucent) flash cover-lens 62. The rear flash reflector 60 is secured to the half-housing 54, and the front flash cover-lens 62 is secured to the flash circuit board 52. A rear conventional energy-storing main capacitor 64 is electrically connected to the flash circuit board 52 and is chargeable to a storage capacity which is sufficient to cause the flash tube 58 to provide flash illumination when the main capacitor discharges its stored energy through the flash tube. The main capacitor 64 is supported parallel to the flash tube 58 on a pair of split ribs 66 on the half-housing 54. See FIG. 3. A resilient electrical conductor 68 engages an anode (positive) electrode 70 of the flash tube 58 and is electrically connected to the flash circuit board 52. A dual-function electrically conductive single-piece 72 longitudinally extends parallel (for the most part) to the flash tube 58 and has an integrally formed free end 74 that engages a cathode (negative) electrode 76 of the flash tube 52, an integrally formed fixed end 78 that is electrically connected to the flash circuit board 52, and an integrally formed movable dome-shaped switch-closing element 80 that is located between the free end and the fixed end. The free end 74 functions as an electrical conductor for the cathode electrode 76. The electrical conductor 68 and the free end 74 support the flash tube 58 at the anode and cathode electrodes 70 and 76 against the flash reflector 60. Another electrical conductor 82 is supported on the half-housing 54 and is electrically connected to the flash circuit board 52. The electrical conductor 82 has a fixed contact pad 84 spaced slightly beneath the movable-switch-closing element 80. The movable switch-closing element 80 is deformable to permit it be moved against the fixed contact pad 84 without the free end 74 becoming disengaged from the cathode electrode 76 and is resilient to recover an original shape separated from the fixed contact pad. The movable switch-closing element 80 and the fixed contact pad 84 constitute a biased-open flash charge switch 86 which when closed by temporarily deforming the movable switch-closing element 80 against the fixed contact pad 84 permits the main capacitor 64 to be charged.

The front and rear cover parts 14 and 16 constitute a six-faced polyhedron housing 14, 16 having a front face 88 and a top face 90 perpendicular to the front face. See FIGS. 1–3. The front face 88 has a front opening 92 for the taking lens 32, a front opening 94 for the front viewfinder lens 36 and a front opening 96 for the flash cover-lens 62. The top face 90 has a top opening 98 (at least partially) surrounding a known shutter release button 100 that is manually depressible to initiate a film exposure and a top opening 102 (at least) partially surrounding a flash charge button 104. The top opening 102 for the flash charge button 104 is spaced co-planar from the top opening 98 for the shutter release button 100 and is closer to the front opening 96 for the flash cover-lens 62 than to the front opening 94 for the front viewfinder lens 36 and the front opening 92 for the taking lens 32. The flash charge button 104 is integrally cantilever-supported on the front cover part 14 to be manually depressed in order to deform the movable switch-closing element 80 against the fixed contact pad 84 to close the flash charge switch 86 to permit the main capacitor 64 to be charged.

When the flash charge switch 86 is closed, a high-frequency oscillator (not shown) converts the dc voltage from a battery 106 to an ac voltage that's stepped up in a transformer (not shown). This high voltage is rectified by a rectifier (not shown) back to dc and stored in the main capacitor 64. The oscillator, the rectifier, the transformer, and the battery 106 constitute a known flash charging circuit that is activated when the flash charge switch 86 is closed. A known monitoring circuit (not shown) ignites a flash ready light (not shown) when the stored voltage in the main capacitor 64 approaches a peak capacity. The stored voltage in the main capacitor 64 cannot discharge through the flash tube 58 until the xenon becomes ionized. This happens when the camera's shutter-flash synchronization switch closes (not shown) following manual depression of the shutter release button 100, dumping the charge from a small trigger capacitor (not shown) into an ignition coil (not shown) connected to the flash tube 58, which produces a brief burst of voltage applied to the glass wall of the flash tube via a third (triggering) electrode (not shown). The xenon is then ionized to provide a conductive path for the stored voltage from the main capacitor 64, which results in the electronic flash illumination.

The invention has been described with reference to a preferred embodiment. However, it will be appreciated that variations and modifications can be effected by a person of ordinary skill in the art without departing from the scope of the invention.

PARTS LIST 10. camera
12. main body part
14. front cover part
16. rear cover part
18. cartridge receiving chamber 20. film cartridge
22. film supply or film roll chamber
24. filmstrip
26. unexposed film roll
28. film supply spool
30. backframe opening
32. front taking lens
34. optical viewfinder
36. front viewfinder lens
38. rear viewfinder lens
40. film winding thumbwheel
42. narrow opening
44. top spool end
46. teeth
48. rear/bottom portion
50. electronic flash unit
52. flash circuit board
54. half-housing
56. cut-out
58. flash tube
60. flash reflector
62. cover-lens
64. main capacitor
66, 66. split ribs
68. electrical conductor
70. anode electrode
72. single-piece electrical conductor
74. free end
76. cathode electrode
78. fixed end
80. movable switch-closing element
82. electrical conductor
84. fixed contact pad
86. flash charge switch
88. front face
90. top face
92. front opening
94. frontopening
96. front opening
98. top opening
100. shutter release button
102. top opening
104. flash charge button
106. battery

What is claimed is:

1. An electronic flash unit comprising a flash circuit board, an illumination-producing flash tube having two opposite end electrodes, respective electrical conductors contacting said opposite end electrodes to electrically connect them to said flash circuit board, an energy-storing capacitor electrically connected to said flash circuit board and chargeable to a storage capacity sufficient to cause said flash tube to provide illumination, and a flash charge switch which when manually closed permits said capacitor to be charged, is characterized in that:

said flash charge switch has a movable closing-switch element that forms an integral single piece with one of said electrical conductors contacting said opposite end electrodes of said flash tube.

2. An electronic flash unit as recited in claim 1, wherein said one electrical conductor has a fixed end electrically connected to said flash circuit board and a free end engaging one of said opposite end electrodes, and said movable closing-switch element is located between said fixed and free ends.

3. An electronic flash unit as recited in claim 2, wherein said one electrical conductor longitudinally extends parallel to said flash tube.

4. An electronic flash unit as recited in claim 1, wherein said capacitor longitudinally extends parallel to said flash tube.

5. An electronic flash unit as recited in claim 2, wherein said flash charge switch has a fixed switch element electrically connected to said flash circuit board and including a contact pad, and said movable closing-switch element is movable against said contact pad without said free end becoming disengaged from said one electrode in order to manually close said flash charge switch.

6. An electronic flash unit as recited in claim 5, wherein said movable closing-switch element is deformable to permit it to be moved against said contact pad and is resilient to recover an original shape separated from said contact pad.

* * * * *